US009303633B2

(12) United States Patent
Maiyur et al.

(10) Patent No.: US 9,303,633 B2
(45) Date of Patent: Apr. 5, 2016

(54) OVER-SPEED CONTROL SYSTEM AND METHOD

(71) Applicant: Caterpillar Inc., Peoria, IL (US)

(72) Inventors: Sudarshan Maiyur, Cary, NC (US);
Paul Dvorak, Sanford, NC (US);
Michael W. Ries, Coon Rapids, MN (US)

(73) Assignee: Caterpillar Inc., Peoria, IL (US)

( * ) Notice: Subject to any disclaimer, the term of this patent is extended or adjusted under 35 U.S.C. 154(b) by 648 days.

(21) Appl. No.: 13/720,210

(22) Filed: Dec. 19, 2012

(65) Prior Publication Data

US 2014/0075930 A1 Mar. 20, 2014

Related U.S. Application Data

(60) Provisional application No. 61/701,230, filed on Sep. 14, 2012.

(51) Int. Cl.
| | | |
|---|---|---|
| *F16D 31/02* | (2006.01) | |
| *F04B 13/00* | (2006.01) | |
| *F16H 61/4157* | (2010.01) | |
| *F16H 61/462* | (2010.01) | |
| *F04B 17/05* | (2006.01) | |

(52) U.S. Cl.
CPC ............... *F04B 13/00* (2013.01); *F04B 17/05* (2013.01); *F16H 61/4157* (2013.01); *F16H 61/462* (2013.01)

(58) Field of Classification Search
CPC ... F16H 39/02; F16H 61/4157; F16H 61/425; F16H 61/435; F16H 61/462; F16H 61/478

USPC .................................................. 60/488, 492
See application file for complete search history.

(56) References Cited

U.S. PATENT DOCUMENTS

| | | | |
|---|---|---|---|
| 4,253,347 A | 3/1981 | Mizuno et al. | |
| 4,364,230 A | 12/1982 | Holmes | |
| 4,510,750 A * | 4/1985 | Izumi et al. .................... 60/443 |
| 5,121,603 A | 6/1992 | Widemann | |
| 5,307,631 A | 5/1994 | Tatsumi et al. | |
| 5,390,759 A | 2/1995 | Gollner | |
| 5,435,131 A | 7/1995 | Hausman et al. | |
| 5,524,436 A | 6/1996 | Ishino et al. | |
| 5,560,203 A | 10/1996 | Pollman | |
| 5,746,056 A | 5/1998 | Smith | |
| 5,775,453 A | 7/1998 | Williams et al. | |
| 5,996,343 A | 12/1999 | Kuras | |

(Continued)

FOREIGN PATENT DOCUMENTS

| | | |
|---|---|---|
| DE | 4425130 A1 | 2/1995 |
| DE | 19858673 B4 | 3/2006 |

*Primary Examiner* — Michael Leslie
(74) *Attorney, Agent, or Firm* — Leydig, Voit & Mayer, Ltd.; Daniel Spillman

(57) ABSTRACT

A hydraulic power control system includes an engine driving a variable displacement pump. The variable displacement pump is fluidly connected to a first passageway and a second passageway, and has a selectively variable displacement that is adjustable in response to a pump displacement command signal. A hydraulic motor fluidly connected to the first and second passageways operates by a flow of hydraulic fluid originating from the pump. A controller receives an engine speed signal and adjusts pump displacement based on the engine speed signal to reduce the rotation speed of the pump when an overrun condition is present.

15 Claims, 5 Drawing Sheets

(56) References Cited

U.S. PATENT DOCUMENTS

| | | |
|---|---|---|
| 6,164,402 A | 12/2000 | Hastereiter |
| 6,272,950 B1 | 8/2001 | Braun et al. |
| 6,360,537 B1 | 3/2002 | Widemann |
| 7,370,475 B2 | 5/2008 | Nakamura et al. |
| 7,398,648 B2 | 7/2008 | Tatsuno et al. |
| 7,513,110 B2 | 4/2009 | Tasuno et al. |
| 7,543,447 B2 | 6/2009 | Itoga et al. |
| 7,730,722 B2 | 6/2010 | Williams |
| 8,683,794 B2 * | 4/2014 | Fukuda et al. .................. 60/431 |
| 8,880,300 B2 * | 11/2014 | Gamble et al. .................. 60/445 |
| 2010/0083652 A1 | 4/2010 | Fukuda et al. |
| 2013/0111888 A1 * | 5/2013 | Schwab et al. .................. 60/421 |

* cited by examiner

OVER-SPEED CONTROL SYSTEM AND METHOD

CROSS-REFERENCE TO RELATED APPLICATIONS

This patent application claims priority to U.S. Provisional Patent Application No. 61/701,230, filed on Sep. 14, 2012, which is incorporated herein in its entirety by this reference.

TECHNICAL FIELD

This patent disclosure relates generally to hydraulic power systems for use in machines and, more particularly, to systems and methods for controlling machine retarding performance during overrunning operating conditions.

BACKGROUND

Hydraulic power propel systems in machines are known. Such systems include an engine or another prime mover operating a hydraulic pump. The hydraulic pump provides pressurized fluid to a hydraulic motor, which powers the rotation of wheels, tracks or other ground engaging members of the machine. In typical applications, control of machine motion can be accomplished by using variable displacement hydraulic pumps and/or variable displacement hydraulic motors to adjust the effective speed ratio between the engine and the ground engaging members of the machine.

When machine power is used to propel the machine, for example, when the machine is travelling up an incline or travels on flat terrain, the engine speed and machine ground speed can be controlled by appropriately adjusting the displacement of the hydraulic pump and/or motor to match a desired command signal from the operator. However, when the machine travels down a hill, an over-speed condition may occur. Over-speed is typically used to describe an operating condition in which the machine is pulled along, for example, by force of gravity when travelling down a hill, and in which the engine and/or hydrostatic motor tends to over-speed. The over-speed is caused by the motors acting as pumps to push hydraulic fluid through the hydraulic pump that is connected to the engine and thus tends to increase engine speed by pulling the engine along. Depending on the magnitude of the over-speed condition, the engine and/or hydrostatic motor and pump speeds may increase beyond desired speed limits.

Various solutions have been proposed in the past to address engine and pump over speed in hydraulic power drive systems. One known solution approaches the problem by commanding engine and pump control settings to protect the engine and pump from over-speed when various system parameters, such as engine speed, fluid pressure and the like, indicate that an over-speed condition is present. One such example can be seen in U.S. Pat. No. 5,390,759 ("Gollner"), which issued on Feb. 21, 1995, and is directed to a "Driving Mechanism for an Automotive Propel Drive." Gollner describes a system in which engine speed and system fluid pressure are used to control the displacement of the pump and/or the displacement of the motors. Such known systems, although at least partially effective in protecting system components from over-speed, are not as effective in providing a retarding effect that can slow the vehicle when travelling down a hill or under other over-speed conditions. Moreover, the effectiveness of such systems greatly depends on the accuracy and quick response time of system sensors monitoring engine speed and fluid system pressure.

SUMMARY

In one aspect, the disclosure describes a hydraulic power control system. The system includes an engine operating at an engine speed, which engine speed is sensed by an engine speed sensor providing an engine speed signal. The system further includes a variable displacement pump connected to and operated by the engine. The variable displacement pump is fluidly connected to a first passageway and a second passage way. The variable displacement pump has a selectively variable displacement that is adjusted in response to a pump displacement command signal. The system further includes a hydraulic motor fluidly connected to the first and second passageways in a closed hydraulic loop with the variable displacement pump. The hydraulic motor operates by a flow of hydraulic fluid originating from the variable displacement pump and passing through the first and second passageways. A controller associated with the engine and the variable displacement pump is disposed to receive the engine speed signal and to adjust the pump displacement command signal based on the engine speed signal to reduce a rotation speed of the pump and avoid an over-speed condition of the pump when an overrun condition of the engine is indicated by the engine speed signal.

In another aspect, the disclosure describes a machine. The machine includes an engine operating at an engine speed, which is sensed by an engine speed sensor that provides an engine speed signal to a controller. A variable displacement pump is connected to and operated by the engine. The variable displacement pump is fluidly connected to a first passageway and a second passage way, and has a selectively variable displacement that is adjusted in response to a pump displacement command signal provided by the controller. A hydraulic motor is fluidly connected to the first and second passageways in a closed hydraulic loop with the variable displacement pump. The motor is operated by a flow of hydraulic fluid originating from the variable displacement pump and passing through the first and second passageways. The hydraulic motor operates to power an implement of the machine. The controller is associated with the engine and the variable displacement pump and disposed to receive the engine speed signal and to adjust the pump displacement command signal based on the engine speed signal to reduce a rotation speed of the pump and avoid an over-speed condition of the pump when an overrun condition of the engine is indicated by the engine speed signal.

In one embodiment, the machine is a track-type tractor and the implement is a track that engages the ground to propel the machine. In another embodiment, the machine is a compactor and the implement is a vibratory device that includes a rotating weight.

In yet another aspect, the disclosure describes a method for operating a hydraulic system. The method includes monitoring various operating parameters of the hydraulic system and determining, based on the operating parameters, whether an engine over-speed condition is present. When the engine over-speed is determined to be present, a retarding and over-speed protection function is activated. Said function operates to selectively adjust a pump displacement of a hydraulic pump operating to circulate hydraulic fluid through the hydraulic system such that a pump over-speed condition is avoided.

DETAILED DESCRIPTION

Figure 1A:
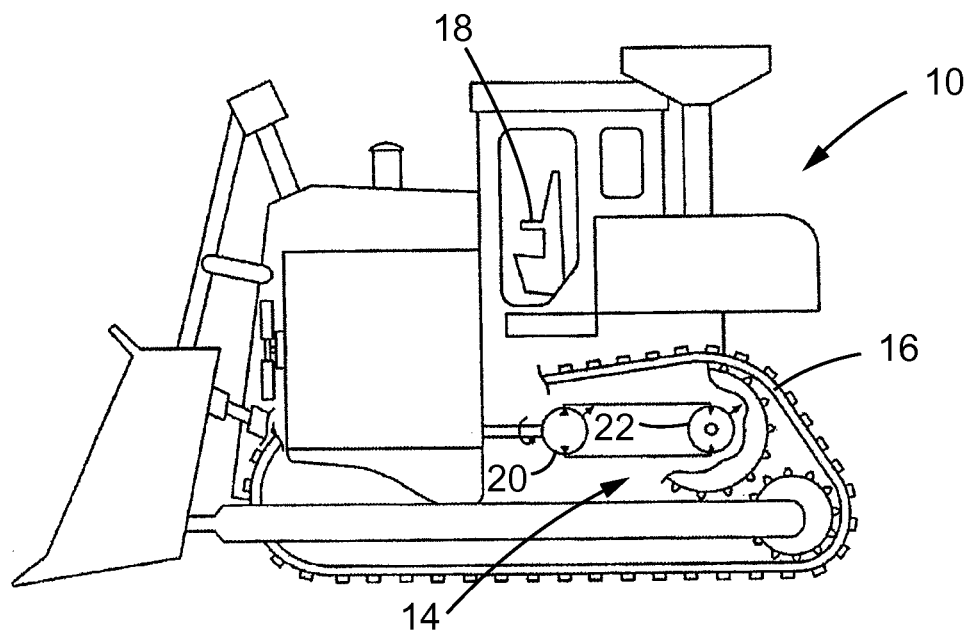
FIG. 1A is a schematic side view of a track type machine suitable for use with the apparatus and method according to the present disclosure.
Figure 1B:
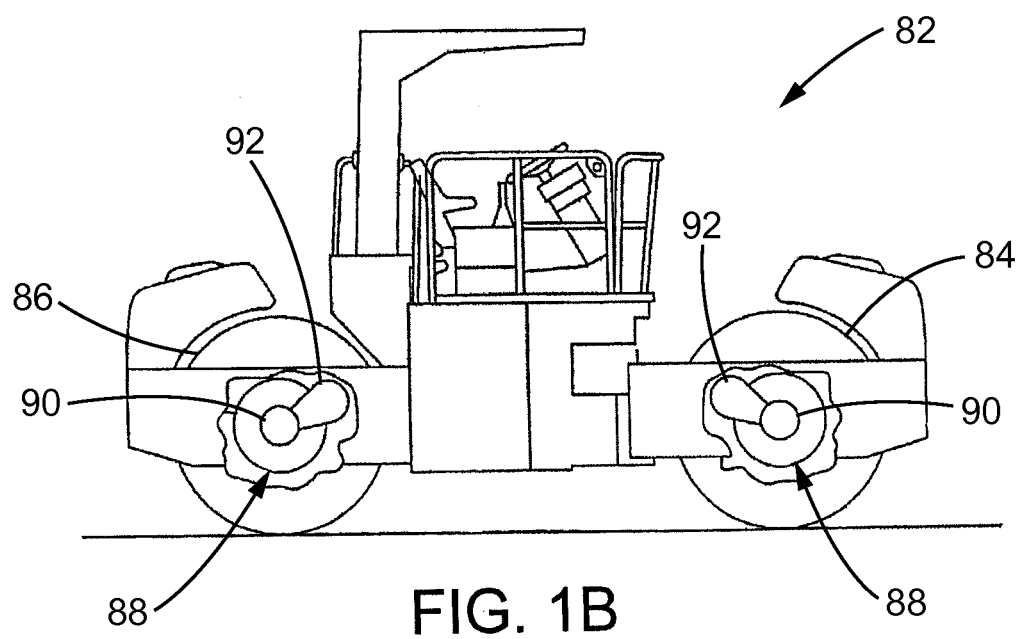
FIG. 1B is a schematic side view of a vibratory machine suitable for use with the apparatus and method according to the present disclosure.

This disclosure relates to an apparatus and method for controlling a hydraulic power system for a machine that may be operable to transmit power to a load associated with the machine and/or provide power to propel the machine. With particular reference to FIGS. 1A and 1B, two examples of machines having hydraulic power systems are shown. In FIG. 1, a track-type tractor is shown, and in FIG. 1B, a vibratory compactor machine is shown.

Figure 2:
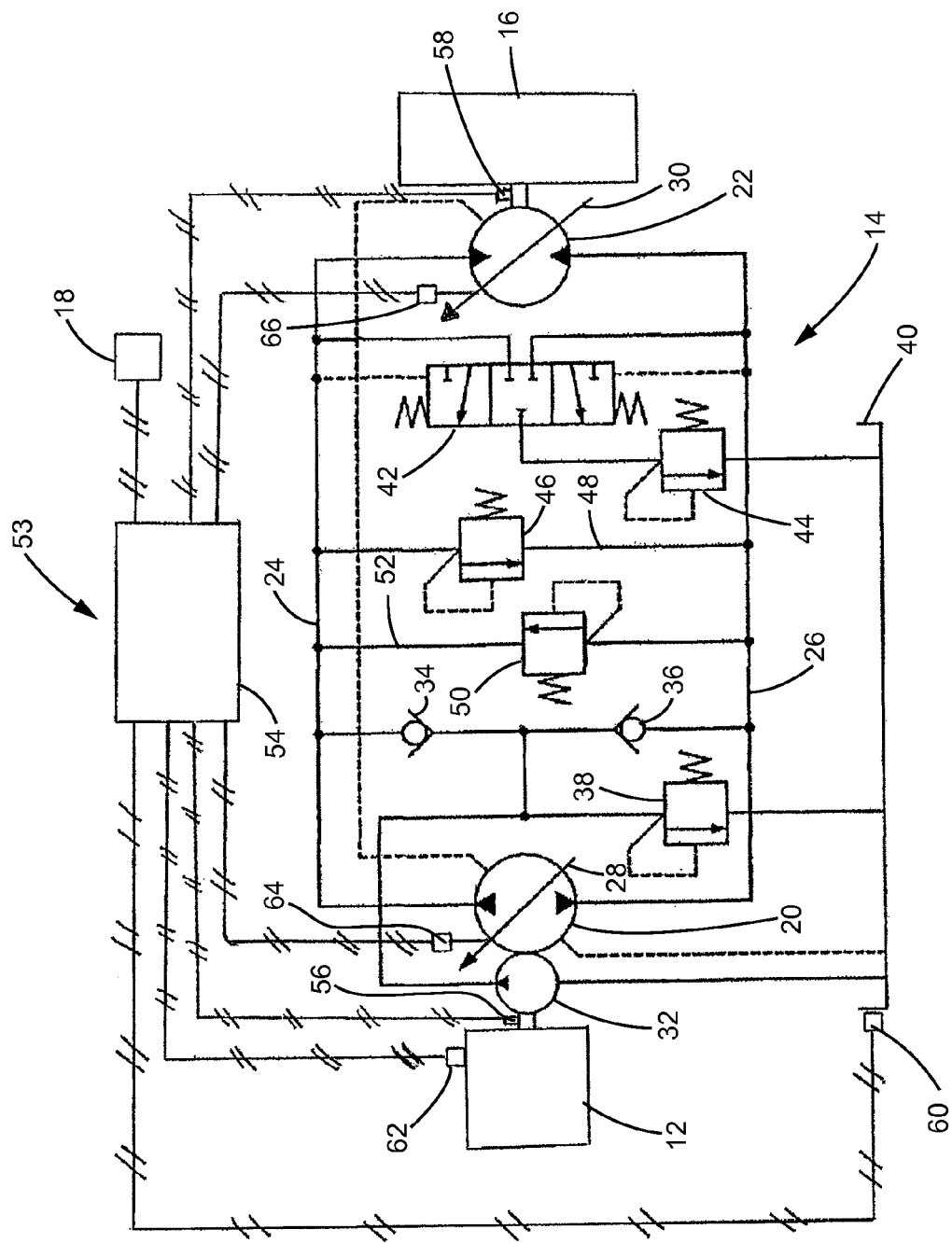
FIG. 2 is a schematic illustration of a hydraulic power system and associated control system according to the present disclosure.

In further reference to FIG. 2, an exemplary machine 10 has a power source 12 (see FIG. 2) and a hydraulic power system 14 that, in this case, transmits power from the power source 12 to a load. The fraction device 16, which propels the machine in response to an input received via operator input device 18. It should be noted that, although only one hydraulic power system and one traction device are illustrated in FIG. 1A, the machine 10 may typically include two hydraulic power systems and two traction devices arranged into two substantially identical drive trains that can be powered by the power source 12 and independently controlled by way of a single or multiple operator input devices 18. An example, of a machine 82 having two traction devices 84, 86 that are visible is shown in FIG. 1B.

While the hydraulic power system 14 is illustrated in connection with a track type tractor or a vibratory compactor, the arrangement disclosed herein has universal applicability in various other types of machines as well. In this regard, the term "machine" may refer to any machine that performs some type of operation associated with an industry such as mining, construction, farming, transportation, or any other industry known in the art. For example, the machine 10 may be an earth-moving machine, such as a wheel loader, excavator, dump truck, backhoe, motor grader, material handler or the like. Moreover, the hydraulic power system 14 may be used to transmit power to other loads as well such as, for example, an implement that is connected to the machine. Such implements may be utilized for a variety of tasks, including, for example, loading, compacting, lifting, brushing, and include, for example, buckets, compactors, forked lifting devices, brushes, grapples, cutters, shears, blades, breakers/hammers, augers, and others.

The power source 12 may be configured to produce a power output and may include an internal combustion engine. For example, the power source 12 may include a diesel engine, a gasoline engine, a gaseous fuel-powered engine, a direct injection gaseous fuel engine, or any other type of engine apparent to one skilled in the art. It is contemplated that the power source 12 may alternatively embody a non-combustion source of power such as a fuel cell, a battery, or an electric motor, if desired. The power source 12 may produce a rotational mechanical output received by the hydraulic power system 14.

The traction device 16 may embody a track located on a side of the machine 10. When two drive trains are included within the machine 10, the two associated fraction devices 16 may be located on opposing sides of the machine 10 and be simultaneously controlled to propel the machine 10 or independently controlled to steer the machine 10. Alternatively, the traction device 16 may embody a wheel, a belt, or any other driven traction device.

The operator input device 18 may be located within an operator station of the machine 10, for example, in close proximity to an operator's seat as shown in FIG. 1. The operator input device 18 may embody any one of numerous devices that control functions of the machine 10. In one example, the operator input device 18 may embody a joystick controller. It is contemplated, however, that operator input device 18 may embody additional or different control devices such as, for example, pedals, levers, switches, buttons, wheels, electronic input devices, and other control devices known in the art. The operator input device 18 may be manipulated to generate signals indicative of a desired output of the hydraulic power system 14 (i.e., a desired travel speed, rim pull torque, and/or travel direction of the machine 10). In one example, a single operator input device 18 may be used to simultaneously control the movement of multiple traction devices 16. In another example, multiple operator input devices 18 may be used to independently control the movement of multiple traction devices 16.

The hydraulic power system 14 (FIG. 2) is suitable to also drive a vibratory mechanism of a machine such as a compactor 82. Referring to FIG. 1B of the drawings, a double-drum compactor 82 used for compacting a material such as soil, gravel, or asphalt to increase the density of the material is shown. While a double-drum compactor 82 is described, the compactor 82 could have more or fewer than two drums. The illustrated compactor 82 has a first compacting drum 84 and a second compacting drum 86 rotatably mounted on a main frame. Each compacting drum 84, 86 includes a respective vibratory mechanism 88. Each vibratory mechanism 88 includes weights 92 arranged on a shaft 90 that is rotatable about a common axis within an interior cavity of the drum for inducing vibrations on the drum.

The rotation of the vibratory mechanisms for the two drums can be driven by a single or respective hydraulic power system 14 such as shown in FIG. 2. Moreover, control of the hydraulic power system 14 can be based on flow across the cross-over pressure relief valve such as with the system shown in FIG. 2 and the controls and methods shown and described below relative to FIGS. 2-5. When using the hydraulic power system 14 to drive a vibratory mechanism 88, the cross-over relief valves 46 or 50 can open and direct hydraulic fluid through the bypass passages 48, 52 when the associated vibratory mechanism 88 achieves maximum acceleration such as during start-up. Each time one of the pressure relief valves 46 or 50 opens, the efficiency of the hydraulic power system may be reduced. That is, because the fluid being relieved has already been pressurized, energy that was used to pressurize that fluid is wasted. This wasted energy may result in a greater amount of fuel being consumed by and require more power from the power source 12.

By reducing the pressure in the system using a pressure control scheme to a level below which the cross-over relief valves 46 or 50 open, the system may produce less than maximum acceleration of the vibratory mechanism. Regulation of operation of the pump 20 and motor 22 (FIG. 2) of the hydraulic power system 14 based on a desired maximum flow across the cross-over pressure relief valve, such as described below relative to FIGS. 3-5, can enable the system to provide maximum acceleration and/or deceleration of the vibratory mechanism 88 with a minimal flow across the cross-over relief valves 46 or 50, which in turn minimizes fuel consumption and heat build-up in the system.

Turning now more specifically to FIG. 2, the hydraulic power system 14 may include a hydraulic pump 20 and a hydraulic motor 22 coupled in a closed loop hydraulic configuration (i.e., the hydraulic power system 14 may be a hydrostatic transmission). The pump 20 may be mechanically driven by the power source 12, while the motor 22 may mechanically drive the traction device 16. A first passageway 24 may direct pressurized fluid discharged from the pump 20 to the motor 22. A second passageway 26 may return used fluid from the motor 22 to the pump 20. It is contemplated that, in some embodiments, the functions of the first and second passageways 24, 26 may be reversed to thereby reverse the travel direction of the traction device 16, if desired.

The pump 20 may be a variable displacement swashplate-type pump that includes multiple piston bores that accept pistons held against a tiltable swashplate 28. The pistons may reciprocate within the piston bores to produce a pumping action as the swashplate 28 rotates relative to the pistons. Alternatively, the swashplate 28 may remain stationary such that pumping action can be provided by a rotating barrel that forms the piston bores. In either configuration, the swashplate 28 may be selectively tilted relative to a longitudinal axis of the pistons to vary a displacement of the pistons within their respective bores. The angular setting of the swashplate 28 relative to the pistons may be carried out by any actuator known in the art, for example, by a servo motor. Although shown in FIG. 2 as producing only a unidirectional flow of pressurized fluid, it is contemplated that the pump 20 may be an over-center type pump or rotatable in opposing directions to produce flows of fluid in opposing directions, if desired.

The motor 22 may be a fixed or variable displacement type motor fluidly coupled to the pump 20. The motor 22 may convert the pressurized fluid from pump 20 into a rotational output of traction device 16. As a variable displacement motor, the motor 22 may include multiple piston bores and pistons (not shown) held against a fixed or rotatable swashplate 30. The angle of the swashplate 30 may determine an effective displacement of the pistons relative to the bores of the motor 22. The angular setting of the swashplate 30 relative to the pistons may be carried out by any actuator known in the art, for example, by a servo motor, hydraulic piston, pneumatic cylinder, mechanical rack and pinion or other gear arrangement and the like.

The hydraulic power system 14 may include a boost circuit associated with the pump that can operate to boost the pressure of the hydraulic fluid that is directed to the input side of the pump 20. As shown in FIG. 2, the boost circuit can include a boost pump 32, check valves 34 and 36 and a boost circuit relief valve 38 that discharges to a sump 40. In a known manner, the boost circuit may interact with a bleeding block to control the low pressure line in the hydraulic power system 14. As noted previously, the low pressure line is typically going to be first passageway 24, which is the return line from the motor 22. Depending on the direction of fluid flow through these circuits, however, the second passageway 26 may be the low pressure line. In this case, the bleeding block can include a shuttle valve 42 and a bleeding block relief valve 44 that is configured to discharge to the sump 40.

In some situations, it may be possible for the pressure of the fluid at the discharge of the pump 20 to exceed an acceptable threshold value. Such conditions may occur, for example, when the machine is pushing against a relatively immovable obstacle. Similarly, the pressure of fluid at the inlet of the pump may increase, for example, during an over-speed condition, when machine momentum rotates the motor, which in turn operates to pump fluid through the system. In the case of a rotating weight, such as the weight described above relative to the vibratory compactor (FIG. 1B), over-speed is relevant to the increased speed of the pump when the rotating weight is decelerating. Such high pressure or over-speed conditions, if unaccounted for, can result in damage to the hydraulic power system 14. As shown in FIG. 2, in order to help minimize damage and ensure predictable operation of the machine 10, a first cross-over pressure relief valve 46 may be situated to selectively direct pressurized fluid from the pump 20 to bypass the motor 22 (i.e., to direct fluid from the high pressure first passageway 24 to the low pressure second passageway 26, without the fluid passing through the motor 22) via a first bypass passageway 48. Additionally, to account for situations in which the second fluid passageway 26 is the high pressure side of the hydraulic system (e.g., when the system is operating in reverse or is operating in a forward over-speed condition), a second cross-over pressure relief valve 50 may be provided that is situated to selectively direct pressurized fluid from the (higher pressure) second fluid passageway 26 to the (lower pressure) first passageway 24 via a second bypass passageway 52.

Although illustrated as pilot operated, spring biased, valve mechanisms, it is contemplated that the cross-over pressure relief valves 46, 50 could alternatively embody an electronic valve actuated in response to a measured pressure, if desired. Additionally, the pressure limit of the pressure relief valves may be variable, and may also be adjustable.

In the hydraulic power system 14, any fluid flow that discharges from the hydraulic pump 20, but does not end up being used to generate speed of the hydraulic motor 22, may be considered as non-productive hydraulic fluid flow, which is also commonly referred to as "waste flow." Waste flow includes any fluid flow through the first and second bypass passageways 48, 52 as a result of operation of either of the cross-over pressure relief valves 46, 50. Additional sources for non-productive hydraulic fluid flow in the hydraulic power system 14 may also include losses in the system as a result of leakage. For example, leakage in the system may be generated by clearances between the pistons and bores of the pump 20 and motor 22, and clearances or leaks in any associated valves.

A control system 53 including a controller 54 with associated sensors may be provided to facilitate operation of the hydraulic power system 14. As schematically shown in FIG. 2, the controller 54 may be in communication with the operator input device 18, the pump 20, the motor 22, a pump speed sensor 56, a motor speed sensor 58, a hydraulic fluid temperature sensor 60, and an engine speed or power source speed sensor 62. Additional sensors may also be provided including, for example, a pressure sensor that is configured for monitoring hydraulic fluid pressure in the hydraulic power system. The temperature sensor 60 may be configured to monitor temperature of hydraulic fluid and may be located anywhere within the hydraulic circuit. For example, the temperature sensor 60 may be configured to monitor the temperature of the hydraulic fluid within the sump 40, as shown in FIG. 2.

The controller 54 may be further configured to generate control signals for regulating operation of the pump 20 and the motor 22. More particularly, the controller 54 may be configured to control displacement of the pump 20 and the motor 22 by, for example, controlling a pump actuator device 64 (e.g., a solenoid and spool valve) to vary the displacement of the pump 20. Additionally, the pump actuator device 64 may provide information to the controller about actual or commanded displacement of the pump 20. Similarly, the displacement of the motor 22 may also be controlled by a motor actuator device 66. The motor actuator device 66 may also provide information to the controller about actual or commanded displacement of the motor 22. The controller 54 may control displacement of the pump 20 and motor 22 based on information received from the operator input device 18 and the various sensors. The controller 54 may be in communication with the operator input device 18, pump 20, motor 22 and sensors via control lines, which may carry digital, analog, or mixed types of signals. Alternatively, communication with the various components may be implemented by mechanical or hydraulic lines.

The controller 54 may embody a single microprocessor or multiple microprocessors. Numerous commercially available microprocessors may be configured to perform the functions of the controller 54. It should be appreciated that the controller 54 may readily embody a general machine microprocessor capable of controlling numerous machine functions. Various other circuits may be associated with the controller 54, such as power supply circuitry, signal conditioning circuitry, data acquisition circuitry, signal output circuitry, signal amplification circuitry, and other types of circuitry known in the art.

The hydraulic power system 14 may provide at least some flow through the cross-over relief valves 46, 50 under at least some operating conditions and for at least some period of time. In certain conditions, flow through the cross-over relief valves 46, 50 may occur during an over-speed condition. In such circumstances, operation of the pump 20 and/or the motor 22 by adjustment of their respective displacement may be controlled to prevent over-speed of the engine, pump and motors while still providing acceptable retarding of the machine 10. Retarding of the machine, as used herein, refers to the induced hesitation against motion of the machine during an over-speed condition, for example, when a machine is coasting down a hill. One embodiment for such a control is disclosed herein, where over-speed control is accomplished by adjusting the pump and motor settings based on a parameter related to the waste flow of the system, i.e., the flow of fluid through the cross-over relief valves 46, 50, and speed of the engine or power source 12. It is contemplated that such over-speed control can be carried out in addition to any other waste flow controls that may be operating in the machine 10 during non over-speed conditions that are based on other parameters, for example, fluid pressure.

Figure 3:
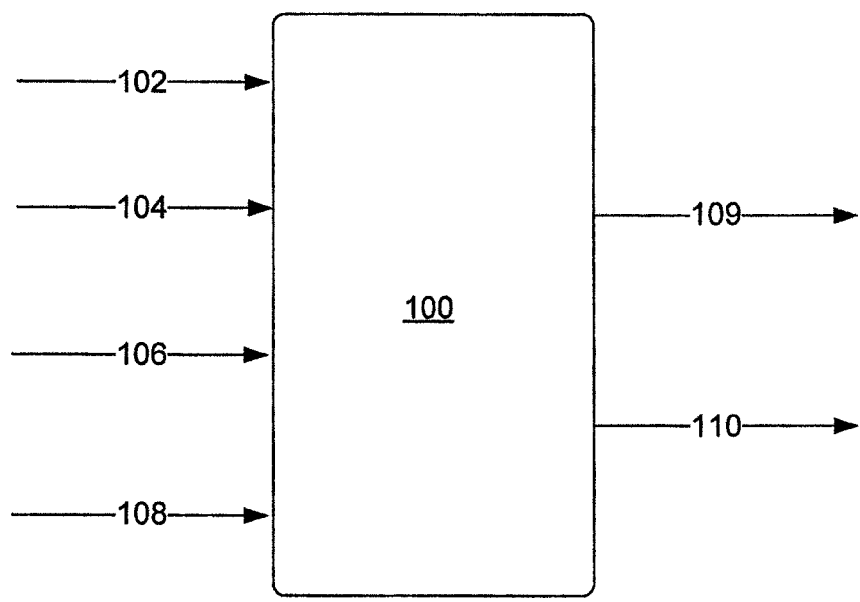
FIG. 3 is a schematic illustration of a hydraulic power control algorithm in accordance with the present disclosure.

A schematic illustration of a control algorithm 100 that may be operating within the controller 54 is shown in FIG. 3. The control algorithm 100 is configured to receive various operating parameters of the machine 10 as inputs that are used to calculate appropriate commands for the pump and motor displacement under all operating conditions. Accordingly, the control algorithm 100 is disposed to receive an engine speed signal 102, which is indicative of the speed at the output shaft of the power source 12. The engine speed signal 102 can be provided, for example, from the power source speed sensor 62 (FIG. 2). Depending on the type of connection between the pump 20 and power source 12, the engine speed signal 102 may be further indicative of the speed of the pump 20. The control algorithm 100 further receives a motor speed signal 104, which is indicative of the speed of the motor 22 (FIG. 2). The motor speed signal 104 may be provided from the motor speed sensor 58 (FIG. 2) and/or other appropriate system sensors. For example, in an alternative embodiment, the motor speed signal 104 may be determined based on a machine ground speed, which is corrected for ground engaging member slip, on a calculation based on system pressure, fluid flow and/or other parameters.

The control algorithm 100 further receives command signals that are indicative of the operating mode desired by the operator. Accordingly, a desired pump command signal 106 may be provided that is indicative of a desired pump displacement, and a desired motor command signal 108 may be provided, which is indicative of a desired motor displacement. The desired pump and motor command signals 106 and 108 may be provided directly, based on signals provided from manual control inputs of the operator, or indirectly such as from other control algorithms (not shown) operating within the controller 54 and serving to optimize machine operation. Under non-over-speed operating conditions, when there is little to no waste flow, the desired pump and/or motor command signals 106 and/or 108 may be provided directly as outputs of the control algorithm 100 such that appropriate functions can be carried out. However, in one embodiment, when the engine speed signal 102 indicates that an over-speed condition is present, the desired pump and/or motor command signals 106 and 108 may be adjusted such that the outputs of the control algorithm 100, i.e., a final pump command 109 and a final motor command 110, are provided. One embodiment for a particular control implementation for the control algorithm 100 is shown in the flowchart illustrated in FIG. 4.

Figure 4:
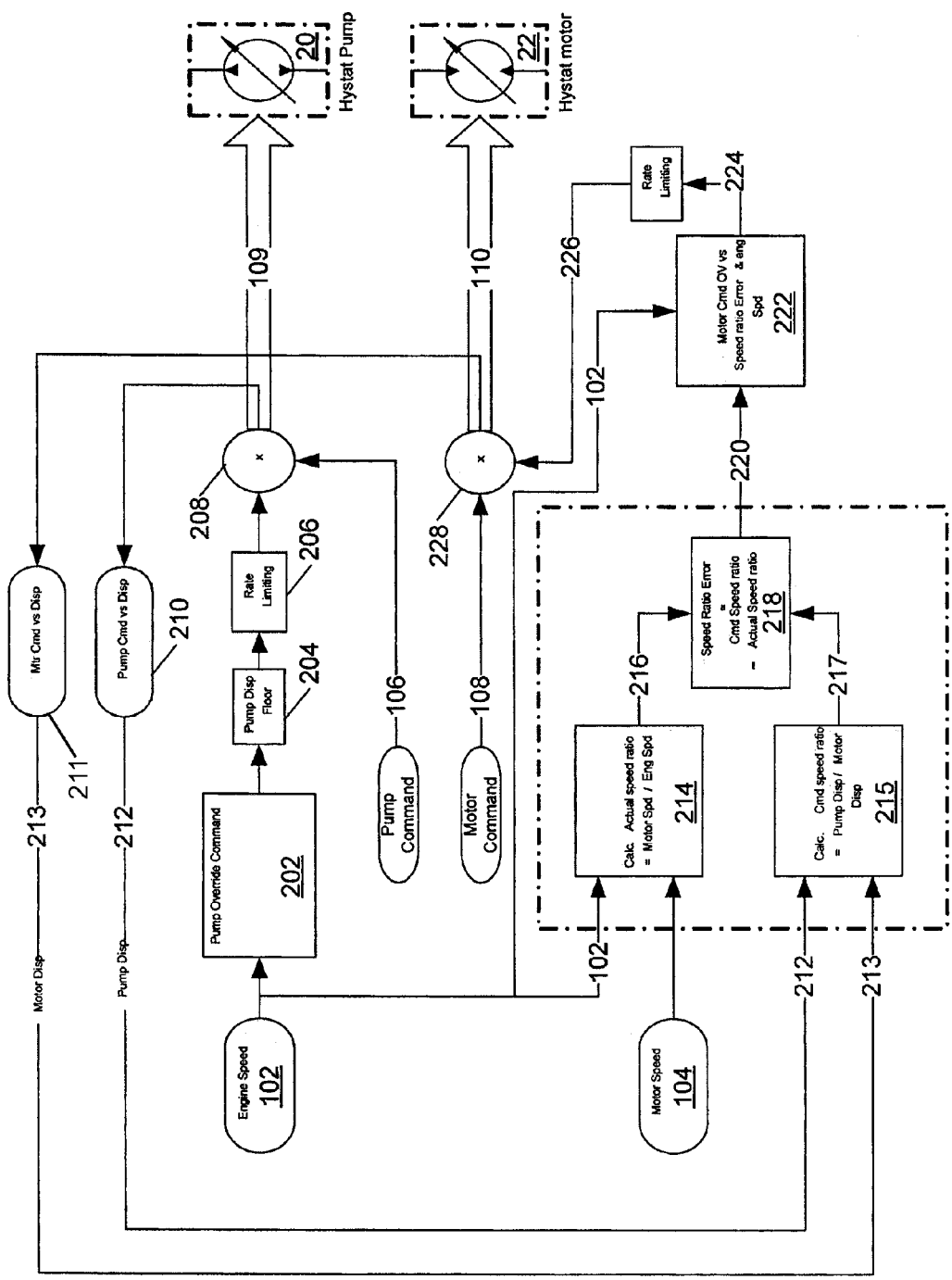
FIG. 4 is a schematic flow diagram illustrating a hydraulic power control algorithm according to the present disclosure.

In reference to FIG. 4, the engine speed signal 102 is provided to a pump override command block 202. The pump override command block 202 may be a function that determines a desired pump displacement setting under non-over-speed conditions, and that also provides an over-speed pump command, which limits the displacement of the pump when an over-speed is detected as indicated by the engine speed 102. In other words, the pump setting may be determined based on operator commands, efficiency, controlling algorithms, and other systems while the operating condition of the system is not in an over-speed operating mode. When an over-speed operating mode is detected, for example, by monitoring the engine speed signal 102 and determining that the speed of the engine has exceeded an upper threshold, then the normal command to the pump may be overridden in favor of a command that seeks to address the over-speed condition of the engine (and pump) by decreasing the displacement command of the pump to slow the pump's rotation. The output of the pump override command block 202 passes through a low threshold function 204, which ensures that the pump is commanded to operate at or above a minimum displacement, a rate limiter function 206, which ensures that command changes to the pump are consistent with the response time capability of the pump, and is provided to a multiplier 208.

The value provided to the multiplier is a scaling factor that is applied to the desired pump command signal 106 at the multiplier 208 to provide the final pump command 109. Therefore, the final pump command 109, in one embodiment, represents the application of a scaling factor to the desired pump command signal 106. The scaling is applied to account for over-speed conditions, maintaining a minimum pump displacement, and for control stability by avoiding step changes in the pump command that exceed the transient capabilities of the pump structure.

The final pump command 109 is also provided to a command-versus-displacement lookup function 210, which provides an estimated pump displacement signal 212. In an alternative embodiment, the pump displacement signal 212 may be provided directly by a sensor associated with the pump swashplate or its actuator (see, for example, swashplate 28 in FIG. 2). In a similar fashion, the final motor command 110 is provided to a motor command-versus-displacement lookup function 211, which provides an estimated motor displacement signal 213. Similarly, in an alternative embodiment, the motor displacement signal 213 may be provided directly by a sensor associated with the motor swashplate or its actuator. The estimated pump and motor displacement signals 212 and 213 are provided to a commanded speed ratio calculation function 215. In one embodiment, the commanded speed ratio calculation function 215 determines a commanded speed ratio value 217 based on a ratio of the estimated (or measured) pump displacement signal 212 over the estimated (or measured) motor displacement signal 213.

In addition to the commanded speed ratio value 217, an actual speed ratio is also calculated based on the engine and motor speed signals 102 and 104. In one embodiment, the engine and motor speed signals 102 and 104 are provided to a speed ratio calculation function 214. The speed ratio calculation function 214 calculates an actual speed ratio value 216, which represents the ratio of the engine speed, as indicated by the engine speed signal 102, over the motor speed, as indicated by the motor speed signal 104.

The actual speed ratio value 216 and commanded speed ratio value 217 are provided to a speed ratio error calculation function 218. The speed error calculation function 218 determines a speed ratio error 220 (SRE), which in this embodiment is determined as the difference between the commanded speed ratio, as represented by the commanded speed ratio value 217 (CSRV), and the actual speed ratio value 216, as represented by the actual speed ratio value 216 (ASRV), according to the following equation:

$$SRE = CSRV - ASRV$$

Under the assumption that the hydraulic fluid in the pump/motor system is substantially incompressible, i.e., ignoring minor localized compressibility effects in the fluid due to air inclusions and various other system losses, the speed ratio error 220 represents the waste flow of the system during an over-speed condition.

The speed ratio error 220 and the engine speed 102 are provided to a motor command scaling function 222. In one embodiment, the motor command scaling function 222 is a lookup function that includes tabulated scaling factors of appropriate motor command scaling factors, which are tabulated against engine speed values and speed ratio error values. The scaling factors can be less than one, when decreasing the displacement of the motor, or more than one, when increasing the displacement of the motor. The motor command scaling function 222 interpolates these inputs to provide a motor scaling factor 224. In one embodiment, the motor command scaling function 222 operates to increase the displacement of the motor as the speed ratio error increases while the engine speed exceeds an upper threshold value indicating that the system is in an over-speed condition. In this way, motor speed is not allowed to excessively increase, engine over-speed is avoided, and a maximum retarding capability can be provided to the machine. A similar control action can be provided to the pump, by applying a similar pump command scaling function to the pump displacement command provided by the pump override command block 202.

It should be appreciated that the motor (and/or pump) command scaling function may alternatively be embodied in any appropriate form such as a lookup function, a polynomial, a surface chart, a fuzzy logic control and other known algorithms. The motor scaling factor 224 represents an appropriate scaling factor that can be applied to modify a motor command to address over-speed conditions. Notably, the determination of the motor scaling factor 224 based on dynamic system operating parameters such as the engine speed and the magnitude of the speed ratio error means that the scaling factor 224 is adjusted in real time to address changing over-speed condition parameters such as changing down hill grades, changing machine loads during the over-speed (e.g., as may be experienced by a machine gradually unloading its cargo while in motion), and other such effects, because the dynamic adjustment of the retarding effect is based on the waste flow as the primary control parameter. In one aspect, therefore, the retarding function described herein is made on the basis of controlling the motor (and/or pump) to minimize waste flow and at the same time maximize the retarding capability on the drive system by adjusting the displacement of the motor (and/or pump) while an over-speed condition is present.

The motor scaling factor 224 is provided, through a rate limiting function 226, as a factor to a multiplier 228. The rate limiting function 226 is optional and operates to limit a rate of change of the motor scaling factor 224 to comport with the transient capability of the system. The multiplier 228 applies the motor scaling factor 224 to the desired motor command signal 108 to provide the final motor command 110, as shown in FIG. 4.

Overall, the system illustrated in FIG. 4 represents a simplified pump and motor control algorithm estimates the over-running factor(s) that are proportional to the over-running load, as indicated by the waste flow of the system. Based on these factors, the motor and pump logic that operates to dynamically adjust motor and/or pump displacement during over-speed conditions. In the illustrated system, the hydrostatic pump is directly controlled by monitoring engine over-speed. Using engine speed, motor speed and operator commands, the displacement is controlled. The calculated overrunning factors can change in this way with grade, for a given load condition, or with load, for a given grade condition, or for both changing load and grade conditions because they depend on machine momentum. At the same time, retarding capability is maximized by independently controlling the hydrostatic pump(s) and motors(s) in the system during over-speed conditions, and by varying pump and/or motor control action depending upon the overrunning load and/or changing grade conditions.

Industrial Applicability

The hydraulic power control system and method described herein may be implemented in a variety of different machines that utilize hydrostatic transmissions to power movement of the machine or operation of an implement that is connected to the machine. The disclosed control system and method may be particularly suitable to applications in which, under at least some operating conditions, machine over-speed can result when the machine is travelling down a hill and/or carries a load that varies. The control algorithms contemplated in this disclosure are arranged to independently control the pump(s) and/or motor(s) of the system while an engine over-speed condition is present. The independent control of the pump(s) and/or motor(s) can be based on an error between commanded and actual speed ratios of the system. Such error, which is indicative, or at least depends on, the waste flow of the system, can be used to control the displacement of the motor(s) and/or pump(s) to minimize waste flow while also maximizing the retarding effect of the drive system on the machine.

Figure 5:
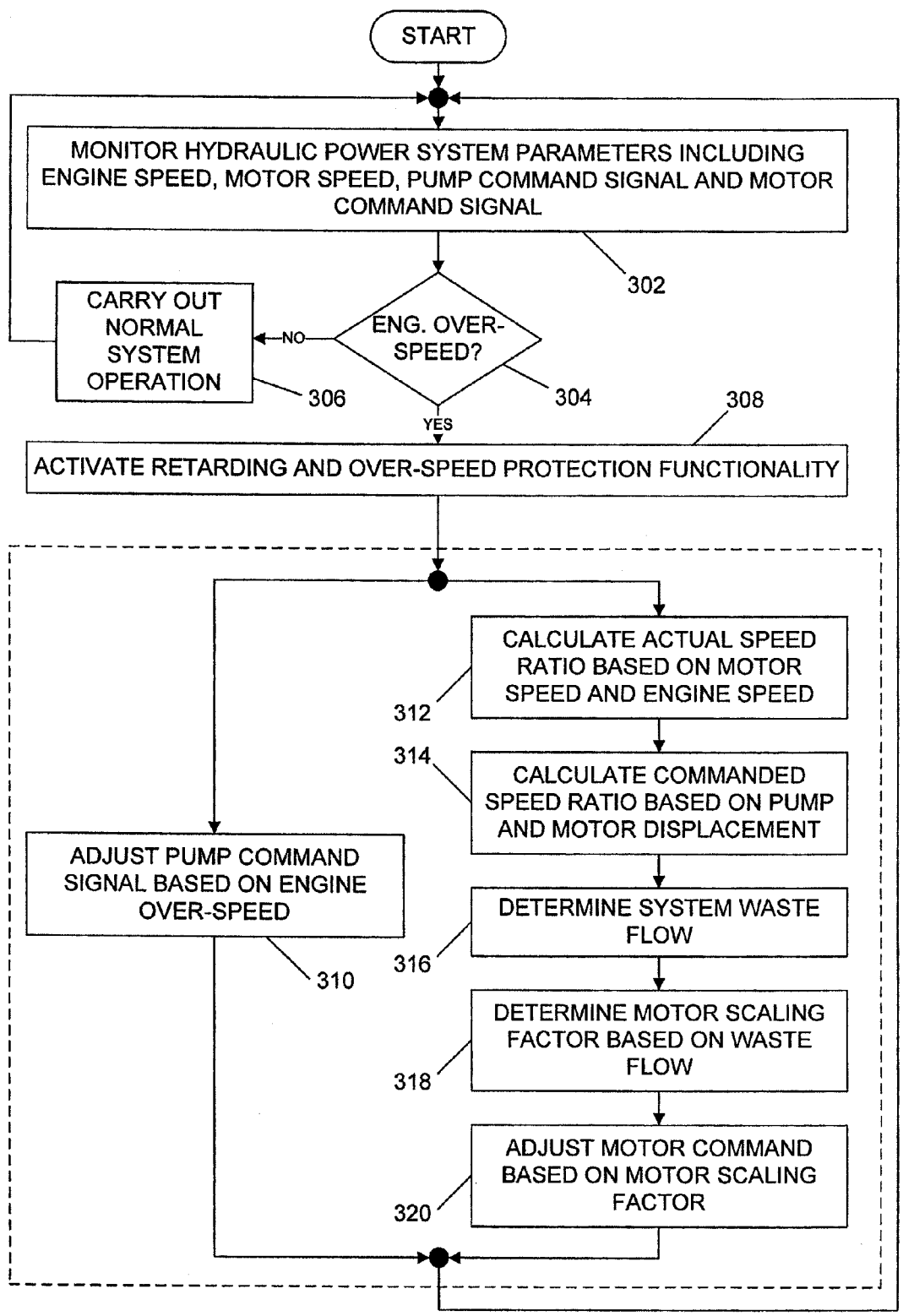
FIG. 5 is a schematic flow diagram illustrating a hydraulic power control method according to the present disclosure.

A flowchart illustrating a hydraulic power control method is shown in FIG. 5. The process begins with monitoring various operating parameters of a hydraulic power system, including engine speed, motor speed, a pump command signal, and a motor command signal at 302. A determination is made at 304 whether an engine over-speed condition is present. When no engine over-speed condition is present, normal system operation is carried out at 306. When engine over-speed is detected, for example, when the speed of the engine exceeds an upper threshold value, a retarding and over-speed protection function is activated at 308.

While the over-speed protection function is active, a pump override command is activated to adjust the pump command signal at 310. In parallel, an actual speed ratio is calculated at 312 based on motor speed and engine speed, and a commanded speed ratio is calculated at 314 based on pump displacement and motor displacement. A waste flow of the system is determined at 316 as the difference between the actual and calculated speed ratios. The system waste flow and engine speed are used to determine a motor scaling factor at 318, which is applied to adjust the motor command at 320. The process repeats while the engine over-speed condition is present.

In one aspect, therefore, the disclosure describes a hydraulic power control system for a machine. The hydraulic power control system includes a hydraulic motor and a hydraulic pump configured to supply hydraulic fluid to the hydraulic motor. A relief valve is configured to release hydraulic fluid from a location between the hydraulic pump and the hydraulic motor when a pressure of the hydraulic fluid exceeds a predetermined pressure. A controller, which communicates with and controls a displacement of, respectively, the hydraulic motor and the hydraulic pump, is configured to monitor engine speed to determine the presence of an engine over-speed condition, for example, when the engine speed exceeds a predetermined threshold. When an engine over-speed condition is present, the controller may take action to reduce engine speed by adjusting the displacement of the hydraulic pump. The controller further determines the wasted flow during the over-speed conditions based on a difference between a commanded speed ratio, which is determined based on a ratio between a displacement of the hydraulic pump and a displacement of the hydraulic motor, and an actual speed ratio, which is based on a motor speed and a pump speed. Waste flow is the flow that is passing through the relief valve. The controller can further the hydraulic pump and/or the hydraulic motor to maximize a retarding capability and/or minimize the waste flow while the over-speed condition is present.

In one disclosed embodiment, the hydraulic pump and the hydraulic motor is each configured to have variable displacement. Accordingly, the controller may regulate the hydraulic pump and/or the hydraulic motor independently by adjusting the respective displacement setting for each device.

Furthermore, the controller in one disclosed embodiment may be further configured to determine the wasted flow during the over-speed condition. Such determination can be carried out, for example, by using the speed and displacement of the hydraulic pump and the speed and displacement of the hydraulic motor as indications of the respective flow through the device, comparing the motor and pump flows, and calculating the waste flow as the difference between these two flows.

In another aspect, the disclosure describes a machine that includes a load, a power source, a hydraulic motor, and a hydraulic pump configured to supply hydraulic fluid to the hydraulic motor. A relief valve releases hydraulic fluid from a location between the hydraulic pump and the hydraulic motor when a pressure of the hydraulic fluid exceeds a predetermined pressure. A controller in communication with the hydraulic motor and the hydraulic pump is configured to determine the presence of an engine overspeed condition, during which an engine speed exceeds a predetermined threshold, and regulate the over-speed condition of the engine by adjusting a displacement of the hydraulic pump. The controller may further determine a value indicative of wasted flow, which is the flow passing through the relief valve, during the over-speed (or over-running load) condition. In one embodiment, the controller determines wasted flow based on a difference between a commanded speed ratio, which is determined based on a ratio between a displacement of the hydraulic pump and a displacement of the hydraulic motor, and an actual speed ratio, which is based on a motor speed and a pump speed. The controller may regulate the displacement of the hydraulic pump and/or the hydraulic motor to maximize a retarding capability of the load during the over-speed or over-running condition. In one embodiment, the controller further regulates the displacement of the hydraulic pump and/or the hydraulic motor to minimize waste flow while the over-speed or over-running condition is present.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A hydraulic power control system, comprising:
an engine operating at an engine speed, the engine speed sensed by an engine speed sensor providing an engine speed signal;
a variable displacement pump connected to and operated by the engine, the variable displacement pump fluidly connected to a first passageway and a second passage way, the variable displacement pump having a selectively variable displacement that is adjusted in response to a pump displacement command signal;
a variable displacement hydraulic motor fluidly connected to the first and second passageways in a closed hydraulic loop with the variable displacement pump, the variable displacement hydraulic motor operating by a flow of hydraulic fluid originating from the variable displacement pump and passing through the first and second passageways, the variable displacement hydraulic motor having a selectively variable displacement that is controlled in response to a motor control signal, the motor operating at a motor speed, the motor speed is sensed by a motor speed sensor providing a motor speed signal;
a waste flow valve fluidly interconnecting the first and second passageways; and
a controller associated with the engine, the variable displacement pump and the variable displacement hydraulic motor, the controller disposed to:

receive the engine speed signal and the motor speed signal;

calculate a speed ratio of engine speed to motor speed based on the engine and motor speed signals;

estimate a waste flow of hydraulic fluid from the pump that bypasses the motor as the flow of hydraulic fluid passes through the waste flow valve based on the speed ratio; and when an overrun condition of the engine is indicated by the engine speed signal, adjust the pump displacement command signal based on the engine speed signal and the estimated waste flow of fluid to reduce a rotation speed of the pump and avoid an over-speed condition of the pump, and adjust the motor displacement signal to effectively retard rotation of the variable displacement hydraulic motor.

2. The hydraulic power control system of claim 1, wherein the controller is further disposed to calculate a speed ratio error based on the speed ratio and a commanded speed ratio, and wherein the displacement of the motor is selectively adjusted based on a motor scaling factor that is determined based on the engine speed signal and the speed ratio error.

3. The hydraulic power control system of claim 2, further comprising selectively adjusting the displacement of the pump in the controller by adjusting the pump displacement command based on a pump scaling factor that is determined based on the engine speed signal and the speed ratio error.

4. A machine, comprising:

an engine operating at an engine speed, the engine speed sensed by an engine speed sensor providing an engine speed signal;

a variable displacement pump connected to and operated by the engine, the variable displacement pump fluidly connected to a first passageway and a second passageway, the variable displacement pump having a selectively variable displacement that is adjusted in response to a pump displacement command signal;

a hydraulic motor fluidly connected to the first and second passageways in a closed hydraulic loop with the variable displacement pump, the hydraulic motor operating by a flow of hydraulic fluid originating from the variable displacement pump and passing through the first and second passageways, the hydraulic motor operating to power an implement of the machine; and a controller associated with the engine and the variable displacement pump, the controller disposed to receive the engine speed signal and to adjust the pump displacement command signal based on the engine speed signal to reduce a rotation speed of the pump and avoid an over-speed condition of the pump when an overrun condition of the engine is indicated by the engine speed signal, wherein the hydraulic motor is a variable displacement hydraulic motor having a selectively variable displacement that is controlled in response to a motor control signal, and the motor operates at a motor speed, which motor speed is sensed by a motor speed sensor and is provided to the controller as a motor speed signal, and wherein when the overrun condition is present the controller is disposed to calculate a speed ratio of engine speed to motor speed based on the engine and motor speed signals, and to regulate the displacement of at least one of the hydraulic pump and the hydraulic motor.

5. The machine of claim 4, wherein the machine is a track-type tractor and the implement is a track that engages the ground to propel the machine.

6. The machine of claim 4, wherein the machine is a compactor and the implement is a vibratory device that includes a rotating weight.

7. The machine of claim 4, further comprising a waste flow valve fluidly interconnecting the first and second passageways, wherein the controller is further disposed to estimate a waste flow of hydraulic fluid from the pump that bypasses the motor as the flow of hydraulic fluid passes through the waste flow valve, wherein the controller is further disposed to selectively adjust the pump control signal based on the estimated waste flow of fluid.

8. The machine of claim 7, wherein estimation in the controller of the waste flow of fluid is based on the speed ratio.

9. The machine of claim 8, wherein the controller is further disposed to calculate a speed ratio error based on the speed ratio and a commanded speed ratio, and wherein the displacement of the motor is selectively adjusted based on a motor scaling factor that is determined based on the engine speed signal and the speed ratio error.

10. The machine of claim 9, further comprising selectively adjusting the displacement of the pump in the controller by adjusting the pump displacement command based on a pump scaling factor that is determined based on the engine speed signal and the speed ratio error.

11. A method for operating a hydraulic system, comprising:

monitoring various operating parameters of the hydraulic system, including a motor speed of a motor operated by a circulating of hydraulic fluid by a hydraulic pump, and an engine speed of an engine driving the hydraulic pump;

determining, based on the operating parameters, whether an engine over-speed condition is present;

when the engine over-speed is determined to be present, activating a retarding and over-speed protection function, said function:

calculating an actual speed ratio based on the motor speed to the engine speed; and operating to selectively adjust a pump displacement of the hydraulic pump based on the actual speed ratio such that a pump over-speed condition is avoided.

12. The method of claim 11, further comprising determining a waste flow of the system as a difference between the actual speed ratio and a desired speed ratio, wherein selectively adjusting a pump displacement is accomplished in part based on the waste flow of the system.

13. The method of claim 12, further comprising selectively adjusting a displacement of the motor based, at least in part, on the waste flow of the system and engine speed.

14. The method of claim 11, wherein selectively adjusting the pump displacement is accomplished in part by determining a pump setting scaling factor that is applied to modify a pump command signal, said pump setting scaling factor being determined based at least in part on engine speed.

15. The method of claim 11, further comprising selectively adjusting a motor displacement by applying a motor setting scaling factor to modify a motor command signal, said motor setting scaling factor being determined based at least in part on engine speed and operating slow rotation of the motor in a retard mode of operation when the over-speed condition is present.

* * * * *